United States Patent [19]

Leiber et al.

[11] Patent Number: 4,919,444
[45] Date of Patent: Apr. 24, 1990

[54] STABILIZER FOR VEHICLES

[75] Inventors: Heinz Leiber, Oberriexingen; Walter Klinkner, Stuttgart; Robert Haid, Vöhringen, all of Fed. Rep. of Germany

[73] Assignee: Daimler-Benz AG, Stuttgart, Fed. Rep. of Germany

[21] Appl. No.: 276,805

[22] Filed: Nov. 28, 1988

[30] Foreign Application Priority Data

Nov. 27, 1987 [DE] Fed. Rep. of Germany ....... 3740244

[51] Int. Cl.⁵ .............................................. B60G 25/00
[52] U.S. Cl. .................................. 280/707; 280/695; 280/721
[58] Field of Search ............... 280/707, 689, 772, 708, 280/721, 723; 180/282, 695

[56] References Cited

U.S. PATENT DOCUMENTS 3,197,233  7/1965  Winsen et al. .................... 280/723
4,815,759  3/1989  Imai et al. ......................... 280/723

FOREIGN PATENT DOCUMENTS 202842  11/1986  European Pat. Off. .
895095   5/1962  United Kingdom .
933581   8/1963  United Kingdom .

Primary Examiner—Richard A. Bertsch
Attorney, Agent, or Firm—Barnes & Thornburg

[57] ABSTRACT

The stabilizer of the present invention has a divided torsion bar, the parts of which can be controllably coupled together or separated from one another by a clutch arrangement. The clutch arrangement is switched to the operative condition when a relatively large transverse acceleration of the vehicle occurs or is anticipated. In this arrangement, the value of the transverse acceleration to be expected is preferably determined from the particular steering angle or the particular rate at which the steering angle changes as well as the particular driving speed by means of a computer controlling the clutch arrangement.

20 Claims, 7 Drawing Sheets

STABILIZER FOR VEHICLES

BACKGROUND AND SUMMARY OF THE INVENTION

The present invention relates to a stabilizer for motor vehicles, having a divided torsion bar, the divided parts of which can be coupled or connected to one another at their mutually adjacent ends by means of a clutch arrangement which can be controlled as a function of the transverse acceleration of the vehicle or a parameter correlated with the transverse acceleration.

Stabilizers are customarily used to couple the wheel suspension of a wheel elastically on one side of the vehicle to the wheel suspension of the corresponding wheel on the other side of the vehicle in such a way that, when one wheel is compressed, the suspension of the other wheel is stressed in the compression direction. When the vehicle is cornering, its side tilt towards the outside of the curve is thereby reduced because the particular wheel toward the outside of the curve is additionally supported by the suspension of the wheel toward the inside of the curve and the wheel toward the inside of the curve is forced somewhat in the compression direction relative to the vehicle body.

In straight line driving on the other hand, the stabilizer should have as little effect as possible on the vehicle or the suspension behavior of the vehicle. However, this can essentially only be guaranteed when the vehicle is travelling over transverse furrows or the like and the wheels on both sides of the vehicle are therefore in each case simultaneously stressed in the compression direction relative to the body. The influence of the stabilizer here is negligible. However, when the roadway is uneven in such a way that a wheel on one side of the vehicle is forced in the compression direction while the corresponding wheel on the other side of the vehicle must be moved in the rebound direction in order to maintain the desired ground contact, the ride comfort is impaired by a stabilizer, since the stabilizer attempts to counteract mutually opposing movements of the wheels coupled by the stabilizer relative to the vehicle body.

It is known from German Published Patent Application (DE-AS) No. 1 105 290 that a stabilizer having a divided torsion bar can be installed, the parts being connected together in the manner of a hydraulic clutch which is controlled as a function of the centrifugal force or the steering of the vehicle. This provides the possibility of rendering the stabilizer inoperative by opening the clutch.

It is known from German Published Unexamined Patent Application No. (DE-OS) 2 849 015 that an undivided stabilizer can be supported on the vehicle body by means of compliant elements, more precisely by means of hydraulic vibration dampers. The bearings of the stabilizer thus have a more or less great mobility relative to the vehicle body. In this arrangement, the hydraulic vibration dampers are of a design such that, in a central or normal position of the stabilizer, they have a negligible damping resistance. The consequence of this is that, in a range near to its central or normal position, the undivided stabilizer is to the greatest possible extent inoperative. During sudden avoidance maneuvers or during cornering on an uneven roadway, this can be disadvantageous.

Therefore, it is an object of the present invention to provide a stabilizer which, during cornering and avoidance maneuvers, is sufficiently effective in every case and otherwise leaves the suspension behavior of the vehicle as far as possible unimpaired in order to ensure a high degree of ride comfort.

This object is achieved in the case of a stabilizer of the type mentioned at the outset because the clutch arrangement permits play of the parts of the torsion rod, which play can be controlled as a function of the actual and/or expected transverse acceleration of the vehicle.

The invention is based on the general idea that a stabilizer should be effective to differing degrees depending on the extent to which transverse forces are acting on or are expected to act on the vehicle. At the same time, according to a preferred embodiment of the invention, provision is made to reduce the play allowed in each case if the actual transverse forces or those to be expected increase. Thus, according to the invention, it is possible to make the efficiency of the stabilizer dependent on the magnitude of the transverse forces.

The transverse acceleration of the vehicle, in accordance with one embodiment of the present invention, is preferably determined by computation. A transverse acceleration can, for example, be determined from the particular steering angle and/or the particular rate at which the steering angle changes and the particular driving speed of the vehicle. To be precise, the value for the transverse acceleration calculated in this manner is the value of the acceleration which is to be expected in each case, the value occurring inasfar as possible during slip-free driving or in the case of good traction. Since a vehicle can only react to changes in the steering angle after a certain time delaY, the transverse acceleration of the vehicle changes after a corresponding time delay following a change in steering angle. If desired, the computer which calculates the transverse acceleration from the steering angle or the rate at which the steering angle changes and also the driving speed can operate with a corresponding delay. In general, however, it is expedient and advantageous if the computer operates without a delay or with a negligible delay. When the vehicle is then steered out of a straight line into a curve, the permissible play of the parts of the torsion rode is then reduced to a greater or lesser extent as a function of the driving speed and the steering angle or of the rate of change of the steering angle, i.e., the stabilizer is prepared and matched to the transverse acceleration of the vehicle to be expected.

Furthermore, provision is expediently made to control the clutch arrangement as a function of data on the tires fitted to the vehicle, the loading condition or the like.

Furthermore, provision can be made to couple the parts of the stabilizer with controllable non-positive engagement, that permits slippage between the parts of the stabilizer above a certain threshold value, the non-positive engagement as a rule increasing as the values for the actual or expected transverse acceleration of the vehicle increase, a slip-free coupling of the stabilizer parts being guaranteed at higher values of the actual or expected transverse acceleration.

In a particularly preferred embodiment of the invention, provision is made to provide a servomotor as clutch arrangement or as part thereof, which servomotor allows clutch-facing ends of the parts of the stabilizer to be displaced relative to one another or be subjected to a positioning force in order to counteract a side tilt of the vehicle towards the outside of the curve. In this embodiment of the invention, account is taken of the fact that the stabilizer parts which have been uncoupled from one another during straight line driving of the vehicle can be displaced comparatively far from a central position relative to one another if the wheel associated with the stabilizer on one side of the vehicle is compressed and the wheel on the other side rebounds. This displacement of the stabilizer parts can be reversed by means of the servomotor in order to render the stabilizer fully operative, in the event of cornering immediately following the compression and rebounding, respectively, of the wheels.

It is also fundamentally possible here to displace the stabilizer parts so far with respect to one another by means of the servomotor that the vehicle body tilts only negligibly or not at all towards the outside of the curve.

Other objects, advantages and novel features of the present invention will become apparent from the following detailed description of the invention when considered in conjunction with the accompanying drawings.

DETAILED DESCRIPTION OF THE DRAWINGS

Figure 1:
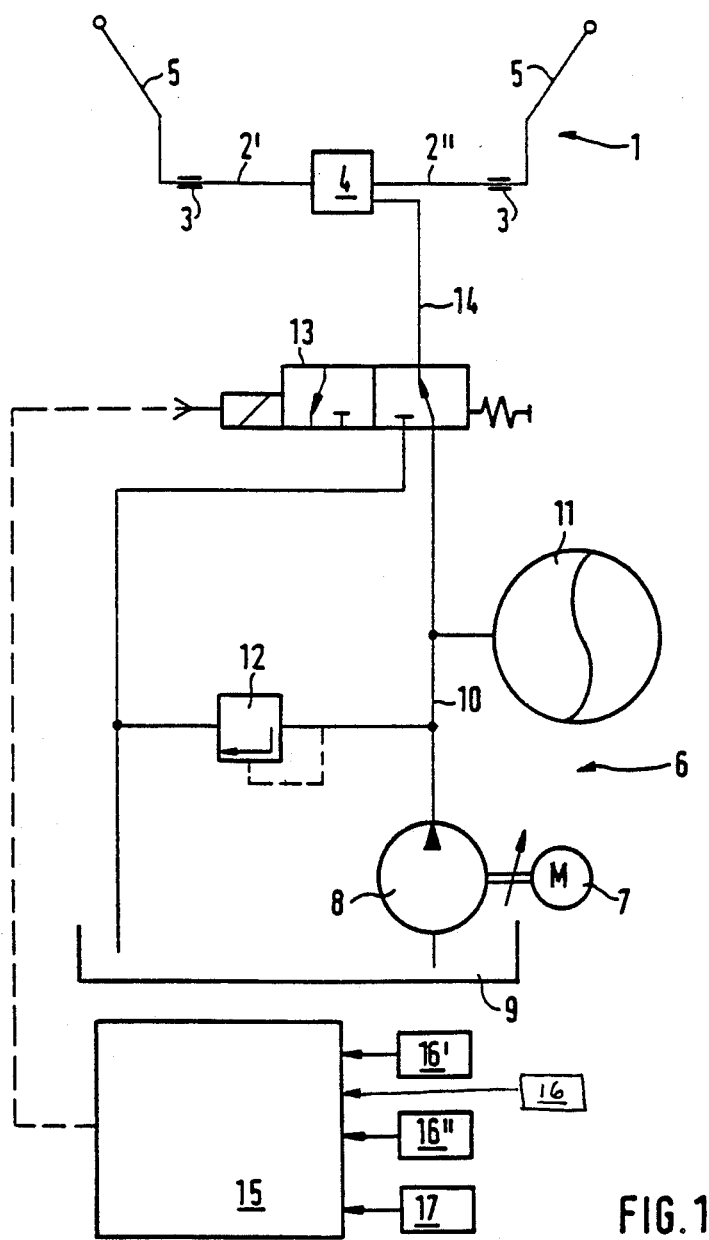
FIG. 1 shows a schematic diagram in the form of a circuit diagram of one embodiment of the stabilizer according to the invention.

According to FIG. 1, a stabilizer, generally referred to by reference numeral 1, has a torsion bar which is arranged in the transverse direction relative to a vehicle and which comprises two parts 2' and 2" which are held rotatably in bearings 3 which are fixed with respect to the vehicle. Between the parts 2' and 2" there is a clutch arrangement 4, which allows the parts 2' and 2" to be coupled together for the transmission of a torque or to be separated for one another so that the parts 2' and 2" of the torsion bar can rotate independently of one another. Lever arms 5 are attached to the mutually remote end of the parts 2' and 2" of the torsion bar, the free ends of which lever end 5 in each case being connected to the wheel suspension of a wheel (not shown) on the right-hand and left-hand side of the vehicle in such a way that, in the case of spring excursions of the associated wheel, each lever arm 5 pivots about the axis of the parts 2' and 2" of the torsion bar.

In the example illustrated, the clutch arrangement 4 is controlled hydraulically by means of a computer controlled actuating unit generally referred to by reference numeral 6.

The actuating unit 6 has a motor-driven pump 8, for example driven by an electric motor 7, the intake side of pump 8 being connected or being connectable to a reservoir 9 for hydraulic medium. The delivery side of pump 8 is connected or can be connected via a delivery line 10 to an accumulator 11 and via a pressure relief valve 12 to the reservoir 9 and via a control valve 13 to the clutch device 4.

In the illustrated position of the control valve 13, which is, for example, designed as a sliding valve, the delivery line 10 is connected to a connecting line 14 of the clutch arrangement 4, i.e., the clutch arrangement 4 is subjected to the pressure of the pump 8 and accordingly held closed (or open). If the control valve 13 is switched into its other position, the connection between the delivery line 10 and the connecting line 14 is blocked and a connection is simultaneously established between the connecting line 13 and the reservoir 9. The clutch arrangement 4 is accordingly relieved of the hydraulic pressure, i.e., the clutch arrangement 4 opens (or closes).

The control valve 13 is controlled by a computer 15 which is connected on the input side to sensor 16 which reacts to inertial forces in the transverse direction of the vehicle to provide any actual transverse acceleration value, sensor 16' for the particular steering angle and sensor 16" for the particular driving speed and, if desired, to further emitters 17 for additional data, for example data on the properties of the tires or the loading condition of the vehicle.

From the steering angle and the driving speed, the computer 15 can calculate an expected value of the transverse acceleration of the vehicle. As soon as the transverse acceleration to be expected exceeds a specifiable threshold value, the control valve 13 is driven in the sense of a locking of the clutch arrangement 4. The parts 2' and 2" of the torsion bar of the stabilizer 1 are thus coupled together, so that the stabilizer 1 is operative and elastically counteracts a different compression and rebounding of the vehicle wheels connected to it. According to the side tilt of the vehicle body which occurs during cornering the two lever arms 5 of the stabilizer 1 assume different pivoted positions relative to the vehicle body, with the result that the parts 2' and 2" of the torsion bar, which parts are, in the closed condition of the clutch arrangement, coupled to one another, are elastically torsioned in a corresponding manner and tend to right the vehicle.

In straight-line driving or when the computer detects a slight or negligible transverse acceleration of the vehicle, the control valve 13 is driven in the sense of an opening of the clutch arrangement 4, so that the parts 2' and 2" of the torsion bar of the stabilizer 1 are uncoupled from one another and the stabilizer 1 is inoperative.

Thus, according to the invention, the stabilizer 1 is operative only in the case of a sufficient actual or to be expected transverse acceleration of the vehicle and hence only in such driving conditions in which an improvement of the driving stability and hence a safety gain are achieved by means of the stabilizer 1. In all other cases, the stabilizer 1 remains inoperative, whereby a considerably improved suspension comfort can be guaranteed, especially on poor roads.

Figure 2:
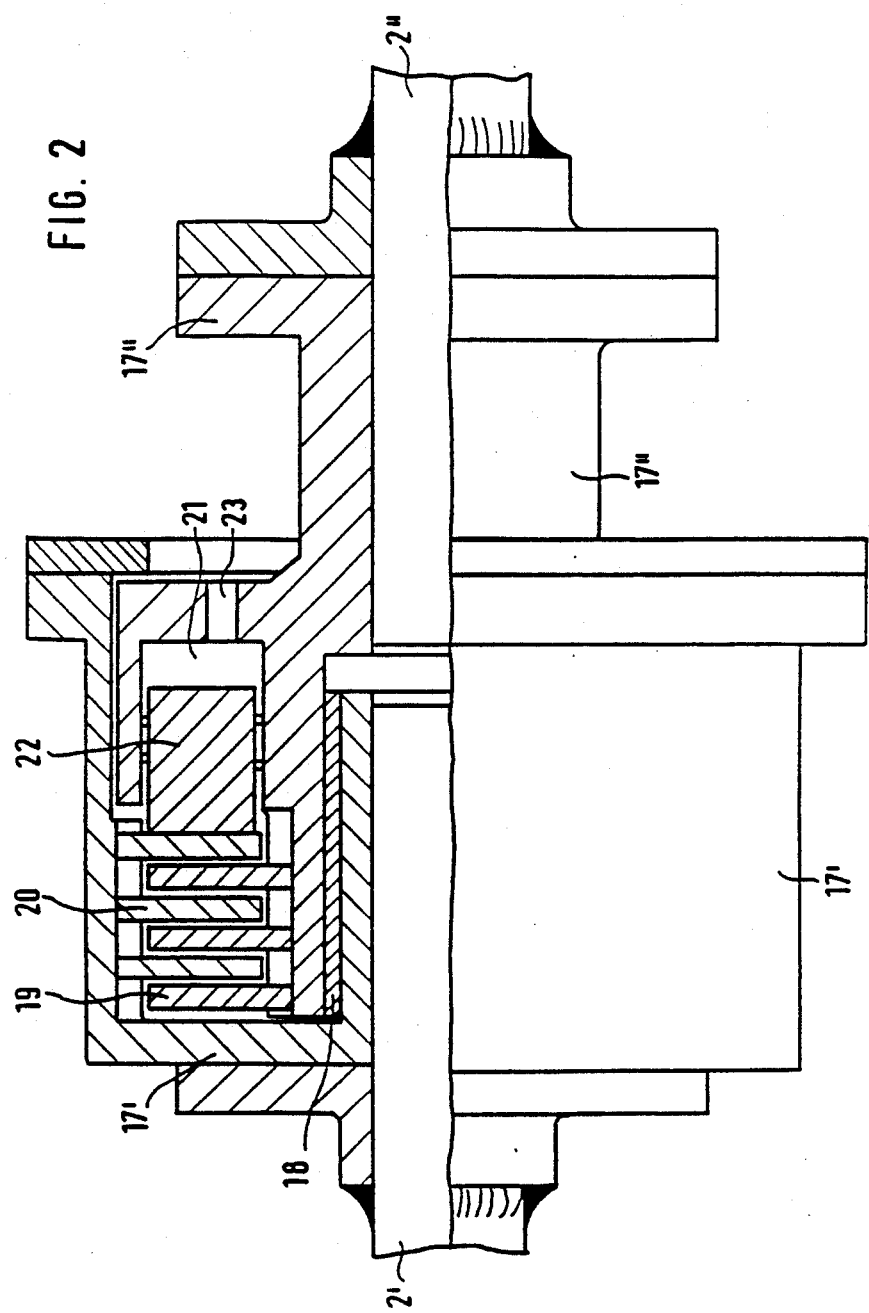
FIG. 2 shows a sectional view of a clutch arrangement designed as a multi-plate clutch for coupling the stabilizer parts.

In accordance with one embodiment of the present invention as shown in FIG. 2, the clutch arrangement 4 can be designed as a multi-plate clutch. The clutch shown by FIG. 2 has a housing essentially formed by the two housing parts 17' and 17", one housing essentially formed by the two housing parts 17' and 17". One housing part 17' is firmly connected to part 2' and the other housing part 17" being firmly connected to part 2" of the stabilizer or to flanges arranged thereon. A bearing 18 is arranged between the housing parts 17' and 17", so that each housing part 17' or 17" is rotatably supported on the other housing part.

The housing parts 17' and 17" together enclose an annular chamber, in which inner plates 19 are arranged non-rotatably but axially displaceably on a section of the housing part 17", which encloses the bearing 18, and in which outer plates 20 are arranged, likewise non-rotatably but axially displaceably on a section of the housing part 17', which forms the outer wall of the housing. An annular chamber 21 is recessed into the housing part 17", the annular chamber 21 accommodating an annular piston 22 in an axially displaceable manner. The annular chamber 21 is connected via an opening 23 to a pressure source or to the connecting line 14 illustrated in FIG. 1, in order to subject the annular chamber 21 to pressurized hydraulic medium. The pressure forces push the annular piston 22 against the inner and outer plates 19 and 20, so that the plates 19 and 20 are coupled non-positively, i.e., permitting slippage. Hence also the housing parts 17' and 17" as well as the parts 2' and 2" of the stabilizer, which parts are connected to the housing parts are coupled to one another non-positively. When the pressure in the annular chamber 21 is relieved, the said non-positive connection is broken.

Instead of the annular chamber 21 and the annular piston 22, it is also possible for a plurality of chambers having a circular cross-section or the like to be provided for a corresponding number of individual pistons wherein the pistons are actuated simultaneously.

Figure 3:
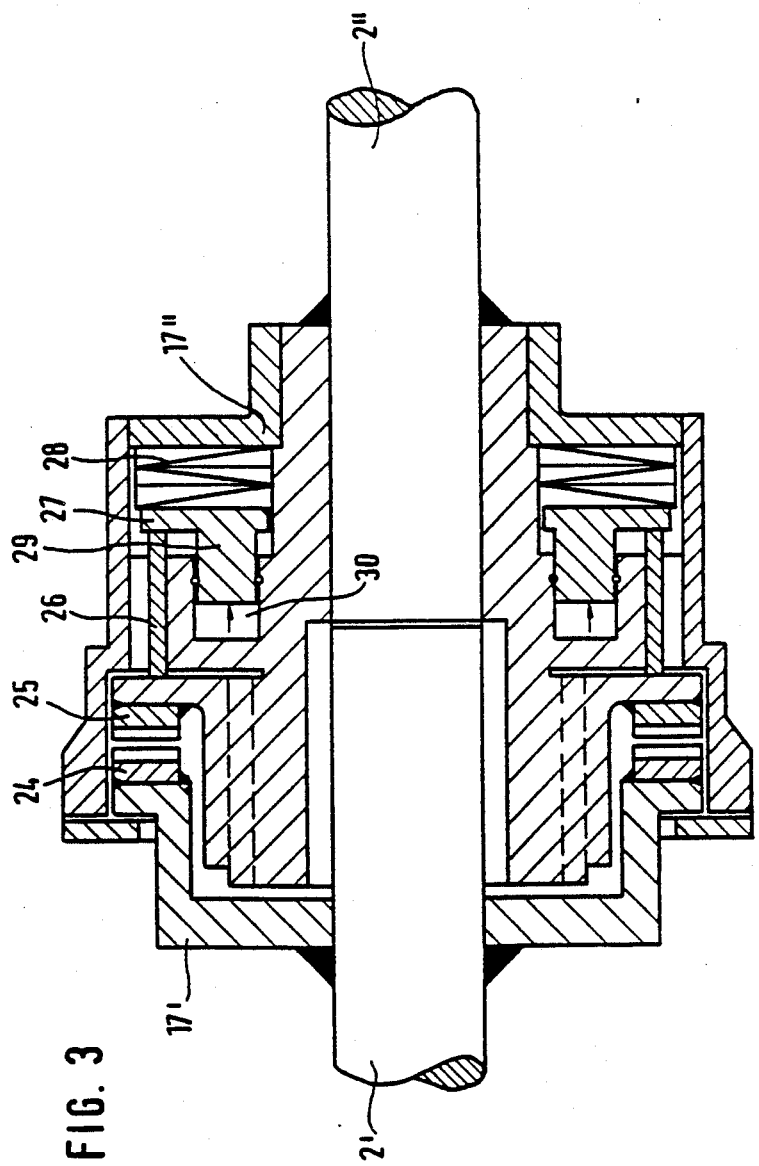
FIG. 3 shows a sectional view of a clutch arrangement designed as a spur tooth clutch.

According to the embodiment depicted by FIG. 3, the clutch arrangement 4 can also be designed as a spur tooth clutch. The clutch illustrated by FIG. 3 again has a two-part housing, one housing part 17' being firmly connected to part 2' and the other housing part 17" being firmly connected to part 2" of the stabilizer. In this arrangement, part 2' is mounted rotatably by means of the bearing 18 inside the housing part connected to part 2".

Within the housing, a spur toothed ring 24 is arranged so as to be non-rotatable and axially non-displaceable on the housing part connected to part 2'. A further spur toothed ring 25 is arranged so as to be non-rotatable but axially displaceable on the housing part connected to part 2". The rings are arranged with mutually facing spur toothing, in such a way that, when the spur toothed rings 24 and 25 engage in one another, a positive coupling is established between the parts 2' and 2" of the stabilizer.

The axially displaceable spur toothed ring 25 or its supporting part are firmly connected via, for example, tappets 26 to an annular flange 27 which in turn is stressed by Belleville washers 28 in a direction which holds the spur toothed rings 24 and 25 in engagement. An annular piston 29 is arranged on the annular flange 27 on the side facing away from the Belleville washers 28 so as to be axially displaceable in an annular chamber 30 on the housing part associated with, for example, part 2". If the annular chamber 30 is connected to a pressure source (in a manner not shown), the annular piston 29 is displaced to the right against the force of the Belleville washers 29 in FIG. 3, the spur toothed ring 25 connected to the annular flange 27 via the tappets 26 being lifted out of its engagement with the other spur toothed ring 24, with the result that the clutch arrangement illustrated assumes its opened condition.

When the annular space 30 is unpressurized in the embodiment illustrated in FIG. 3, the clutch arrangement is held continuously in the closed condition by the Belleville washers 28, so that the stabilizer is always operative even in the case of a defect of the pressure source which can be connected to the annular chamber 30.

Departing from the arrangement illustrated in FIG. 3, having an annular piston 29 and an annular chamber 30, it is also possible for a pluralitY of individual pistons which operate in associated individual chambers to be arranged on the annular flange 27.

As regards other details, the arrangement illustrated in FIG. 3, in which the clutch arrangement is opened by hydraulic pressure action, can also be used in principle in the multi-plate clutch illustrated in FIG. 2.

Figure 4:
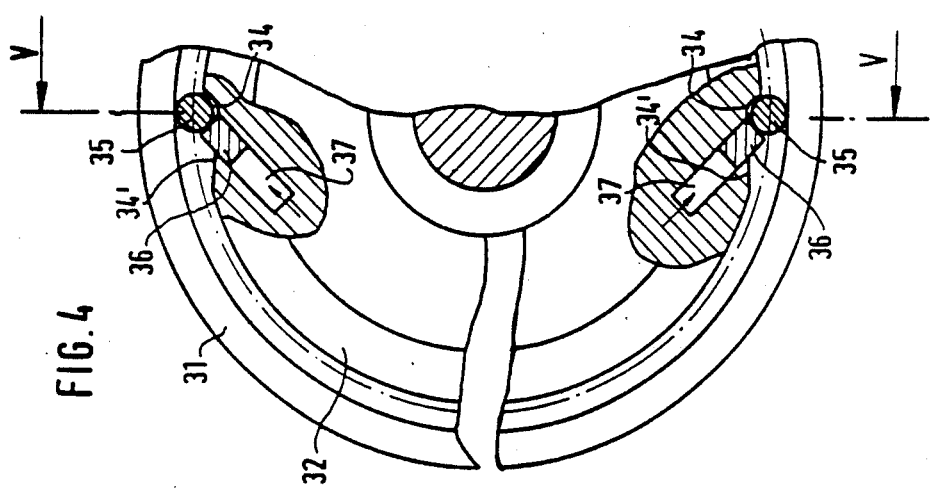
FIG. 4 shows a clutch arrangement having a grip roller lock.
Figure 5:
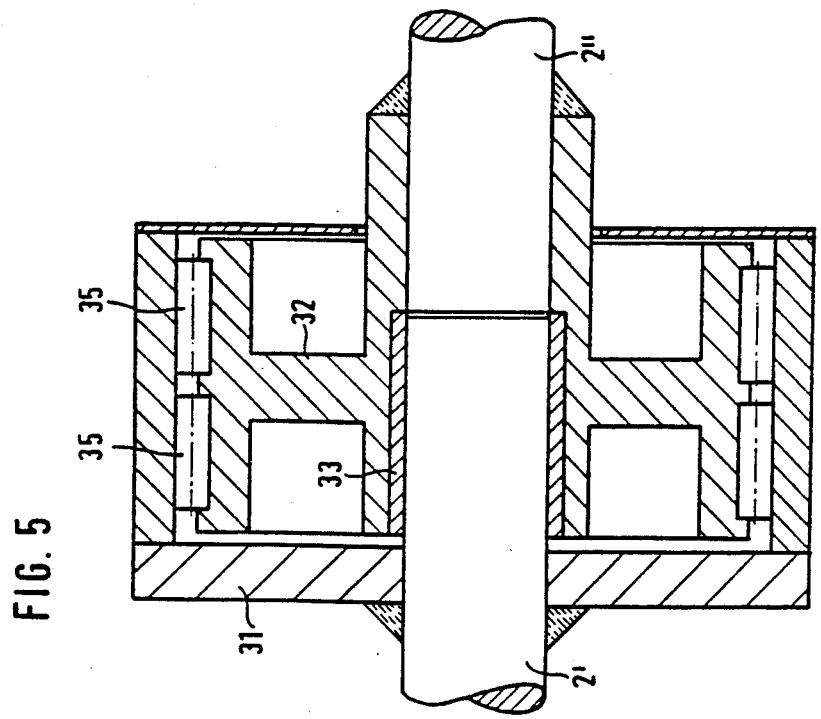
FIG. 5 shows an axial section of the clutch arrangement illustrated in FIG. 4, in accordance with line of section V—V.

The clutch arrangement illustrated in FIGS. 4 and 5 is designed as a grip roller lock. In this embodiment of the present invention, a hollow wheel 31 is firmly arranged on, for example, part 2' of the stabilizer, the periphery of the hollow wheel 31 surrounding an internal wheel 32 with radial clearance. The internal wheel 32 is firmly arranged on, for example, the other part 2" of the stabilizer and accommodates a bearing 33 for rotatably mounting the end of part 2', such that the end of part 2' protrudes somewhat into the internal wheel 32.

Axial grooves 34 having an unsymmetrical cross-section are arranged on the outer periphery of the internal wheel 32. One side wall of each axial groove 34 extends relatively steeply to the peripheral surface of the internal wheel 32 while the other side wall has only a slight slope angle relative to the adjoining region of the peripheral surface of the internal wheel 32. Roller-type rolling elements 35 are arranged cage-fashion in the axial grooves 34. The rolling elements 35 are dimensioned so that they have a slight play between the hollow wheel 31 and the internal wheel 32 as long as they are located near to the deepest region of the axial grooves 34. When the hollow wheel 31 in FIG. 4 rotates counter-clockwise relative to the internal wheel 32, the rolling element 35 at the top in FIG. 4 is carried along to the left. In the process, the rolling element 35 rolls on the side wall 34' of the axial groove 34 at the top in FIG. 4 until jamming or wedging of this rolling element 35 is achieved between the side wall 34' of the axial groove 34 at the top in FIG. 4 and the inside of the hollow wheel 31. The hollow wheel 31 and the internal wheel 32 are thus coupled virtually rotationally fast relative to one another in this direction of rotation.

As soon as the direction of rotation of the hollow wheel 31 relative to the internal wheel 32 is reversed, i.e., as soon as the hollow wheel 31 is rotated clockwise relative to the internal wheel 32, the jamming or wedging of the rolling element 35 at the top in FIG. 4 between hollow wheel 31 and internal wheel 32 is released again. If hollow wheel 31 rotates sufficiently far relative to the internal wheel 32, the rolling element 35 which is at the bottom in FIG. 4 and is carried along in this direction of rotation by the hollow wheel 31 rolls at the same time onto the side wall 34' of the lower axial groove 34, which is arranged symmetrically to the upper axial groove 34. A rotationally fast coupling of hollow wheel 31 and internal wheel 32 is thus established once again. Hollow wheel 31 and internal wheel 32 thus have a certain play relative to one another between the clamping positions of the rolling elements 35.

If required, all rolling elements 35 can be held fast in the inoperative position in the region of the greatest depth of the axial grooves 34. For this purpose, piston-shaped slides 36 are used which are arranged so as to be slideably displaceable in corresponding bores 37 of the internal wheel 32. The bores 37 on that side of the piston-shaped slides 36 which faces away from the rolling elements 35 can be subjected to pressure via pressure ports (not shown), so that the piston-shaped slides 36 are displaced into the extended position illustrated in FIG. 4 and at the same time carry the rolling elements 35 along in the direction of the deep region of the axial grooves 34 and prevent them from jamming or wedging between internal wheel 32 and hollow wheel 31.

Figure 6:
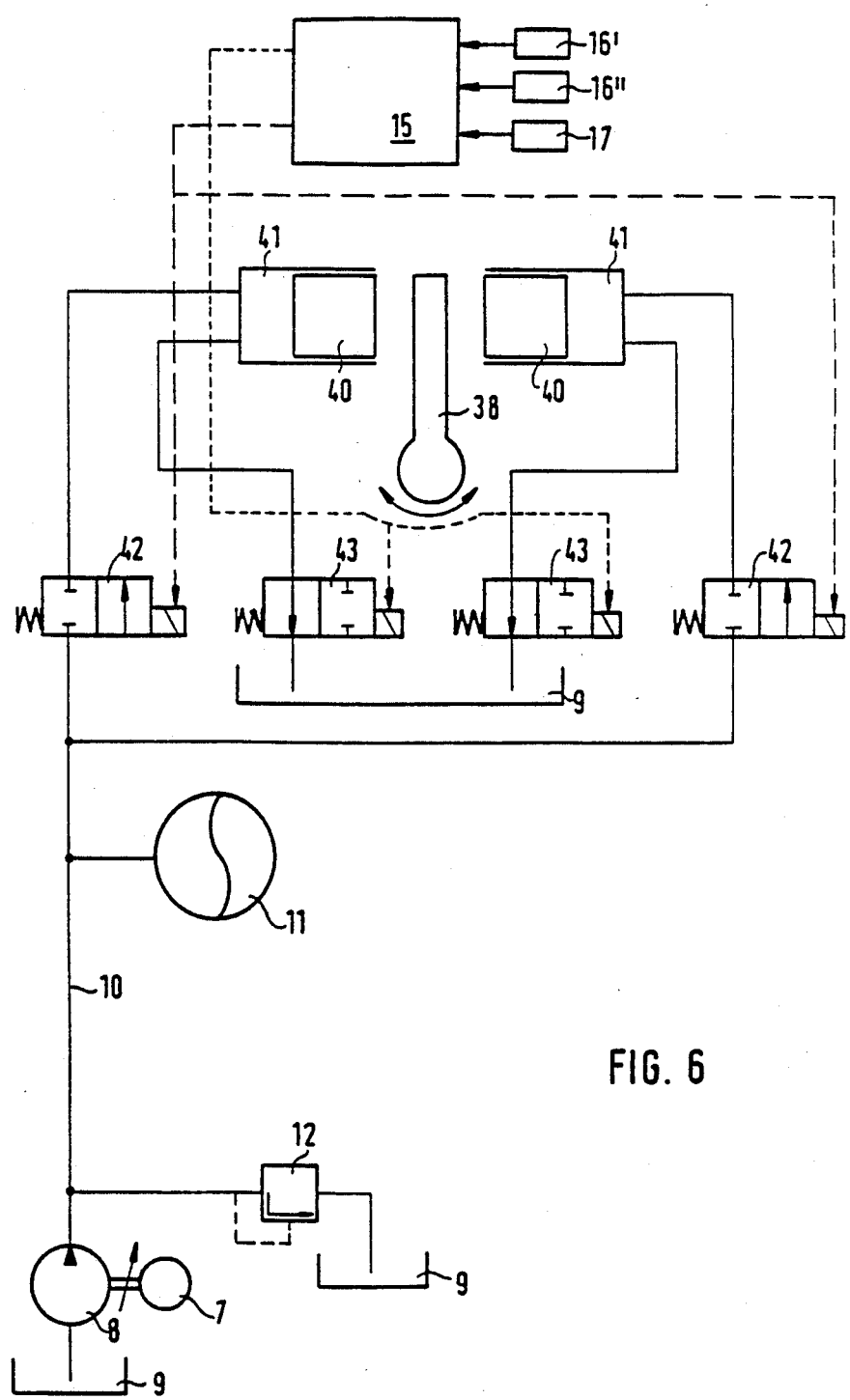
FIG. 6 a circuit diagram of a stabilizer arrangement whose stabilizer parts are coupled to one another with play which can be altered by a servomotor.
Figure 7:
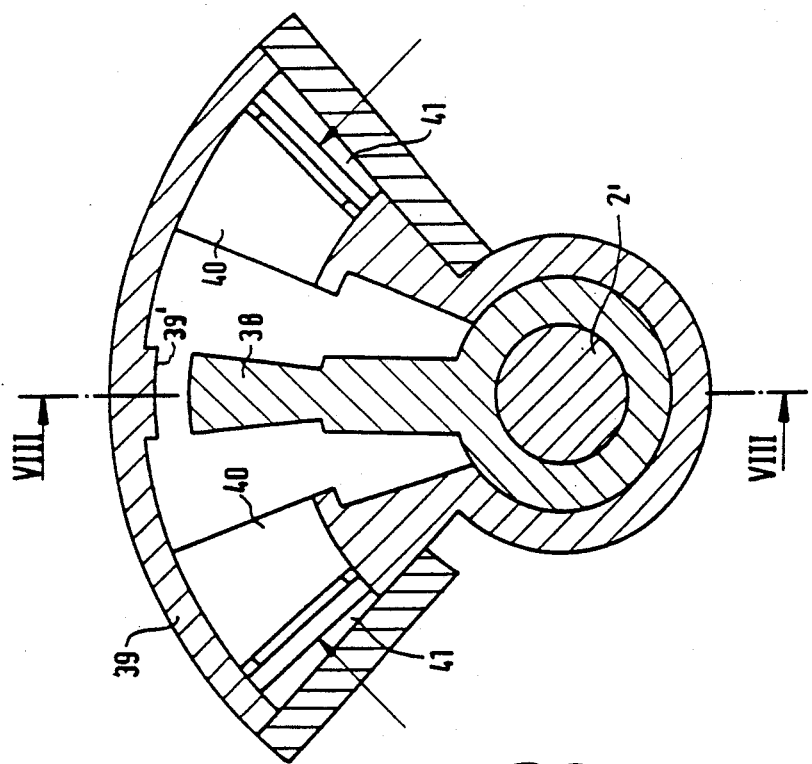
FIG. 7 shows a cross-section of such a servomotor as illustrated in FIG. 6.
Figure 8:
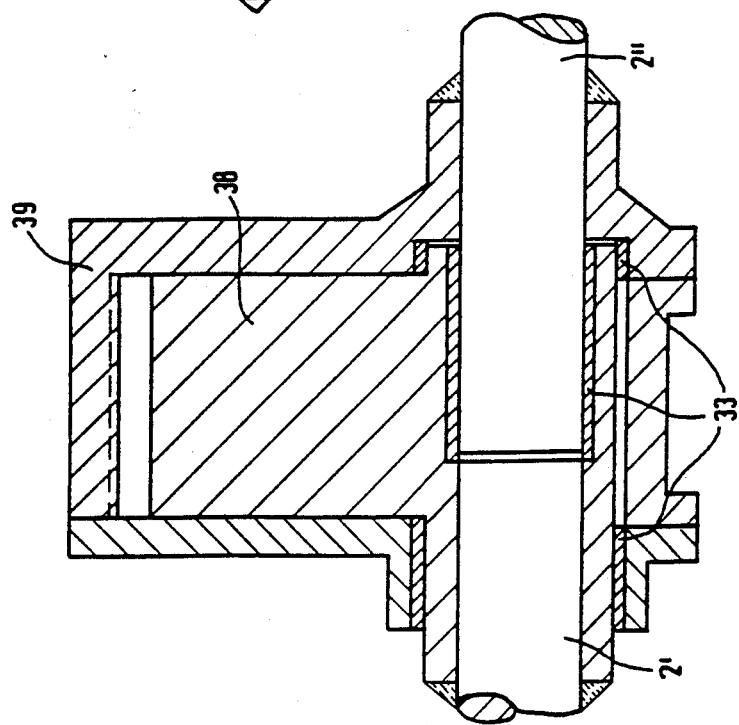
FIG. 8 shows an axial section of the servomotor in accordance with the line of section VIII—VIII in FIG. 7.

In the embodiment of the invention illustrated in FIGS. 6–8, a pivoting finger 38 is firmly arranged on, for example, part 2' of the stabilizer. This pivoting finger 38 is arranged pivotably between two pressure pistons 40 inside a housing 39 firmly arranged on, for example, the other part 2'', the pressure pistons 40 being accommodated in arcuate piston working spaces 41 so as to be displaceable over a circular path with respect to the axis of the parts 2' and 2'' in the housing 39. On their sides facing the pivoting finger 38, the piston working spaces 41 are thus closed by the respective pressure pistons 40. Hydraulic pressure medium can be introduced into the piston working spaces 41 via pressure lines (not illustrated in FIGS. 7 and 8) in order to move the pressure pistons 40 forward towards one another and towards the pivoting finger 38 in each case within the housing 39, so that the mobility of the pivoting finger 38 within the housing 39 is correspondingly restricted or the pivoting finger 38 arrested in the housing 39.

According to FIG. 7, a centering stop 39' for the pistons 40 is arranged on the housing 39. When the pistons 40 rest on this stop 39', the pivoting finger 38 is held immobile relative to the housing in the central position illustrated in FIG. 7. If the pistons 40 are held in positions at an interval from the centering stop 39', as illustrated in FIG. 7, the pivoting finger 38 has a corresponding freedom of movement within the housing 39, i.e., the parts 2' and 2'' (c.f. also FIG. 8) of the stabilizer can move freely relative to one another. If required, the pistons 40 can be set to unequal intervals from the centering stop 39' in order to limit the mobility of pivoting finger 38 and housing 39 and of the parts 2' and 2'' of the stabilizer unsymmetrically to a central position.

Deviating from FIG. 7, an embodiment is also possible without centering stop 39'. This creates the possibility of pushing the pistons 40 beyond the space occupied in FIG. 7 by the centering stop 39', thus enabling the pivoting finger 38 also to be arrested between the pistons 40 in an off-center position relative to the housing 39. In addition, there is once again the possibility of limiting the mobility of the pivoting finger 38 within the housing 39 unsymmetrically to the central position of the pivoting finger 38 illustrated in FIG. 7 if only one of the pressure pistons 40 is pushed towards the pivoting finger 38 or the pressure pistons 40 are pushed forwards to an unequal extent towards the pivoting finger 38.

The control of the pistons 40 is explained with reference to FIG. 6. On the delivery side, the pump 8, which is once again connected on the intake side with the reservoir 9 and is driven by the motor 7, is once again connected to a delivery line 10 which is connected to the reservoir 9 via an adjustable pressure relief valve 12. In addition, the accumulator 11 is connected to the delivery line 10. Additionally, the delivery line 10 can be connected to or separated from the piston working spaces 41 via inlet valves 42. The piston working spaces 41 can be connected to the reservoir 9 or shut off from the reservoir 9 via outlet valves 43.

When, as illustrated in FIG. 6, the outlet valves 42 are open and the inlet valves 42 are shut off, the pivoting finger 38 can push the pressure pistons 40 into the end position in which they are retracted into the piston working spaces 41. The pivoting finger 38 thus has its maximum possible freedom of movement between the pressure pistons 40, i.e., the parts 2' and 2'' of the stabilizer are uncoupled from one another to the maximum possible extent and can be displaced relative to one another virtually without resistance through relatively large swiveling angles.

If the outlet valves 43 are pushed into the blocking position (not shown), then, after the opening of the inlet valves 42, the pressure pistons 40 can be pushced out of the piston working spaces 41 to a greater or lesser extent; the respective pushed-out position can be held by both inlet valves 42 and outlet valves 43 being or remaining closed. If required, the pressure pistons 40 can also be pushed out of their piston working spaces 41 to an unequal extent if the two inlet valves 42 are opened for an unequal length of time, while the outlet valves 43 remain closed, and hence connect the piston working spaces 41 for an unequal length of time to the delivery line 10. To the extent that the pivoting finger 38 is resting against a pressure piston during the displacement of the pressure pistons 40, a displacement of pivoting finger 38 and housing 39 relative to one another and a relative displacement of parts 2' and 2'' of the stabilizer takes place simultaneously.

The valves 42 and 43 are controlled by means of a computer 15 as shown in FIG. 6 which can be connected on the input side to sensors 16' and 16'' for the steering angel and the driving speed. In addition or as an alternative, further signal emitters can be provided, for example, a signal emitter for the roll angle or a signal emitter for the transverse acceleration of the vehicle. The computer 15 is thus provided with the possibility of controlling the valves 42 and 43 such that the pivoting finger is displaced within the housing 39 by the pressure pistons 40 in such a way that the actual roll angle occurring in each case is minimized In the embodiment of the stabilizer illustrated in FIG. 9, the mutually facing ends of the parts 2' and 2'', as shown in FIG. 1, of the stabilizer in each case support a lever arm 44' and 44'' respectively, each lever arm 44' and 44'' being connected rotationally fast to its associated part 2' and 2'' of the stabilizer. The free ends of the lever arms 44' and 44'' are connected to one another via a double-acting piston/cylinder unit 45 or a correspondingly double-acting displacement unit.

In a first embodiment, a line which can be shut off is arranged between the cylinder spaces, separated by the piston, of the piston/cylinder unit 45, which line, in the opened condition, makes possible an exchange of hydraulic medium between the two chambers of the piston/cylinder unit 45. Accordingly, the lever arms 44' and 44" can pivot relative to one another, the piston of the piston/cylinder unit 45 being displaced in one direction or the other. If required, this displacement takes place against the throttle resistance of this line. As soon as the line is shut off, the piston of the piston/cylinder unit 45 is arrested in its respective position, and accordingly the lever arms 44' and 44" too are prevented from swivelling relative to one another.

Figure 9:
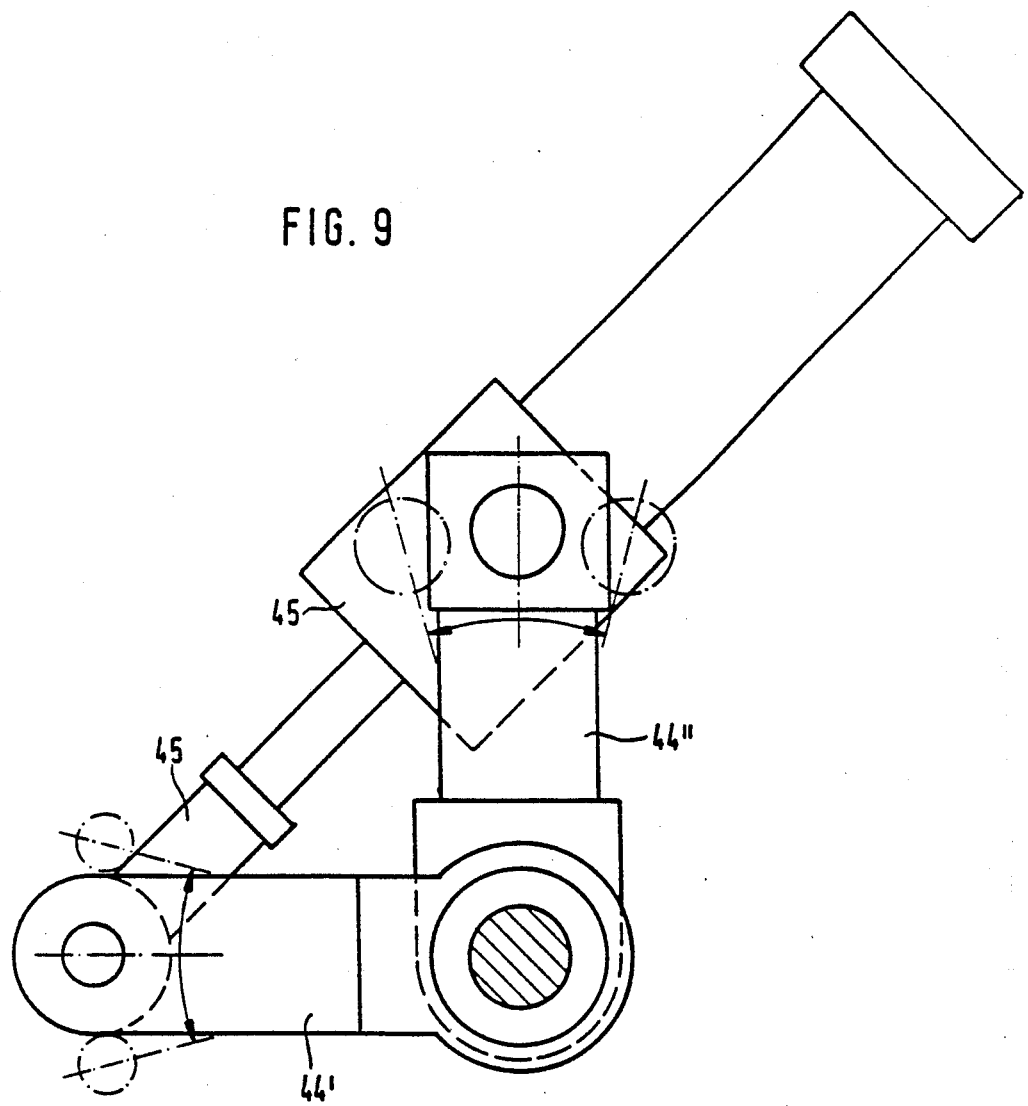
FIG. 9 shows an axial view of a stabilizer arrangements, the stabilizer parts of which are coupled by means of a piston/cylinder unit.

In a second embodiment, the two cylinder spaces separated from one another by the piston in the piston/cylinder unit 45 can be connected to or separated from a hydraulic pump via inlet valves and opened to or shut off from a reservoir via outlet valves in the same way as the piston working spaces 41 in FIG. 6. By appropriate control of the inlet and outlet valves there is thus the possibility of arresting the piston in any position within the piston/cylinder unit 45 or forcibly displacing it or causing it to be displaced in on direction or the other. Accordingly, the levers 44' and 44" are held immobile relative to one another or displaced relative to one another or moveable relative to one another; the like applies to the parts 2' and 2" shown in FIG. 1 of the stabilizer. In FIG. 9, various positions of the levers 44' and 44" relative to one another are illustrated in chain-dotted lines.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A stabilizer for motor vehicles comprising:
    a torsion bar divided into independently rotatable first and second parts, each part having a free end and an end adjacent an end of the other part;
    coupling means having an open and a closed position for decoupling and coupling, respectively, adjacent ends of the first and second parts to one another, the coupling means varying the degree of allowable rotation of the first and second parts with respect to one another;
    means for determining a value of an anticipated transverse acceleration of a vehicle;
    means for determining a valued of an actual transverse acceleration of a vehicle; and
    control means for controlling the coupling means to couple the first and second parts together as a function of at least one of a value of an anticipated transverse acceleration of a vehicle, and a value of an actual transverse acceleration of a vehicle.

2. A stabilizer according to claim 1, wherein the degree of allowable rotation between the first and second parts is inversely proportional to at least one of a value of an anticipated transverse acceleration of a vehicle, and a value of an actual transverse acceleration of a vehicle.

3. A stabilizer according to claim 2, wherein the means for determining a value of an anticipated transverse acceleration includes at least one of means for determining a value of a steering angle of a vehicle, means for determining a value of a rate of change of a steering angle of a vehicle, and means for determining a driving speed of a vehicle; and computer means for calculating a vlue of an anticipated transverse acceleration from at least one of a value of a steering angle of a vehicle; and a value of a rate of change of a steering angle of a vehicle at a given driving speed.

4. A stabilizer according to claim 3, further comprising:
    means for determining values of handling characteristics of tires fitted to a vehicle; and
    means for determining a value of a loading condition of a vehicle;
    wherein the control means controls the coupling means as a function of at least one of a value of a loading condition of a vehicle and values of handling characteristics of tires fitted to a vehicle.

5. A stabilizer according to claim 4, wherein the coupling means permits the transmission of a minimum torque between the first and second parts of the torsion bar when the coupling means is open.

6. A stabilizer according to claim 5, wherein the coupling means is actuated by at least one of a hydraulic medium and a pneumatic medium.

7. A stabilizer according to claim 6, wherein the coupling means assumes a closed position when at least one of a hydraulic medium pressure and a pneumatic medium pressure is negligible.

8. A stabilizer according to claim 7, wherein the coupling means comprises:
    a pair of pressure pistons inside a housing affixed to one of the first and second parts of the torsion bar;
    a pivot finger affixed to the other of the first and second parts, the pivot finger being pivotally arranged between the pair of pressure pistons; and
    means for moving the pressure pistons towards one another to restrict the pivotal movement of the finger to a desired degree and for moving the pressure pistons away from one another.

9. A stabilizer according to claim 2, wherein the coupling means comprises a clutch for varying the degree of coupling of the first and second parts to one another, such that a threshold magnitude of a torque between the first and second parts can be variably set at which slippage of the clutch occurs.

10. A stabilizer according to claim 9, wherein the degree of coupling of the first and second parts to one another is inversely proportiOnal to at least one of a value of an anticipated transverse acceleration of a vehicle, and a value of an actual transverse acceleration of a vehicle.

11. A stabilizer according to claim 10, wherein the means for determining a value of an anticipated transverse acceleration includes at least one of means for determining a value of a steering angle of a vehicle, means for determining a value of a rate of change of a steering angle of a vehicle, and means for determining a driving speed of a vehicle; and computer means for calculating a value of an anticipated transverse acceleration from t least one of a value of a steering angle of a vehicle, and a value of a rate of change of a steering angle of a vehicle, at a given driving speed.

12. A stabilizer according to claim 11, further comprising:
    means for determining values of handling characteristics of tires fitted to a vehicle;
    means for determining a value of a loading condition of a vehicle; and
    wherein the control means controls the coupling means as a function of at least one of a value of a loading condition of a vehicle and values of handling characteristics of tires fitted to a vehicle.

13. A stabilizer according to claim 12, wherein the coupling means permits the transmission of a minimum torque between the first and second parts when the coupling means is open.

14. A stabilizer according to claim 13, wherein:
adjacent ends of the first and second parts have clutch-face ends; and
the coupling means is a servomotor for allowing the clutch-face ends of the first and second parts to be displaced relative to one another from a non-engaging position to an engaging position for transmitting torque between the first and second parts.

15. A stabilizer according to claim 14, wherein the coupling means is actuated by at least one of a hydraulic medium and a pneumatic medium.

16. A stabilizer according to claim 15, wherein the coupling means assumes a closed position when at least one of a hydraulic medium pressure and a pneumatic medium pressure is negligible.

17. A stabilizer according to claim 16, wherein the coupling means is a multi-plate clutch.

18. A stabilizer according to claim 13, wherein the coupling means is a claw clutch or a spur clutch.

19. A stabilizer according to claim 13, wherein the coupling means is a grip-roller clutch.

20. A stabilizer according to claim 1, further comprising:
a pair of lever arms for attachment to the free end of each of the first and second parts;
a double-acting displacement unit attaching one end of each of the pair of lever arms together;
means for attaching the other end of each pair of lever arms to one of the first and second parts; and
means for controlling the displacement of the double acting displacement unit.

* * * * *